(12) United States Patent
Tuli

(10) Patent No.: US 10,108,738 B2
(45) Date of Patent: Oct. 23, 2018

(54) IMAGE TRANSMISSION METHOD

(76) Inventor: Raja Singh Tuli, Montreal (CA)

( * ) Notice: Subject to any disclaimer, the term of this patent is extended or adjusted under 35 U.S.C. 154(b) by 0 days.

(21) Appl. No.: 12/261,524

(22) Filed: Oct. 30, 2008

(65) Prior Publication Data

US 2010/0115056 A1 May 6, 2010

(51) Int. Cl.
H04L 29/06 (2006.01)
G06F 17/30 (2006.01)
H04L 29/08 (2006.01)

(52) U.S. Cl.
CPC ........ *G06F 17/30905* (2013.01); *H04L 67/02* (2013.01); *H04L 67/04* (2013.01)

(58) Field of Classification Search
CPC ..................................................... H04L 41/22
USPC ......................................................... 709/247
See application file for complete search history.

(56) References Cited

U.S. PATENT DOCUMENTS

| 6,366,933 | B1* | 4/2002 | Ball et al. ..................... 715/203 |
| 6,477,579 | B1 | 11/2002 | Kunkel |
| 6,594,744 | B1* | 7/2003 | Humlicek et al. ............ 711/162 |
| 6,633,314 | B1 | 10/2003 | Tuli |
| 6,690,403 | B1 | 2/2004 | Tuli |
| 6,842,777 | B1 | 1/2005 | Tuli |
| 6,874,009 | B1 | 3/2005 | Tuli |
| 6,894,661 | B1 | 5/2005 | Tuli |
| 6,915,327 | B1 | 7/2005 | Tuli |
| 6,928,461 | B2 | 8/2005 | Tuli |
| 6,941,382 | B1 | 9/2005 | Tuli |
| 7,023,572 | B2 | 4/2006 | Tuli |
| 7,068,381 | B1 | 6/2006 | Tuli |
| 7,191,211 | B2 | 3/2007 | Tuli |
| 7,289,244 | B2 | 10/2007 | Tuli |
| 7,356,570 | B1 | 4/2008 | Tuli |
| 7,360,173 | B2 | 4/2008 | Tuli |
| 7,365,871 | B2 | 4/2008 | Monroe |
| 2005/0216949 | A1* | 9/2005 | Candelora et al. ............ 725/134 |
| 2007/0073650 | A1* | 3/2007 | Lueck .................. 707/3 |
| 2007/0143672 | A1* | 6/2007 | Lipton et al. .................. 715/530 |
| 2007/0198603 | A1 | 8/2007 | Tsioutsiouliklis |
| 2007/0271332 | A1* | 11/2007 | Joshi et al. .................... 709/203 |
| 2008/0104269 | A1* | 5/2008 | Vitanov et al. ............... 709/236 |
| 2008/0115081 | A1* | 5/2008 | Sankaravadivelu et al. ................ 715/783 |
| 2008/0136942 | A1* | 6/2008 | Yoon et al. ............... 348/231.99 |
| 2008/0201452 | A1* | 8/2008 | Athas et al. .................. 709/219 |
| 2008/0294750 | A1* | 11/2008 | Kosonen ....................... 709/219 |
| 2009/0049156 | A1* | 2/2009 | Aronsson et al. ............ 709/219 |
| 2009/0131025 | A1* | 5/2009 | Sharma et al. ............ 455/414.3 |
| 2009/0177732 | A1* | 7/2009 | Martin et al. ................. 709/203 |
| 2009/0187477 | A1* | 7/2009 | Bardin et al. .................... 705/14 |
| 2009/0187820 | A1* | 7/2009 | Stinson et al. ................ 715/238 |

FOREIGN PATENT DOCUMENTS

WO 2007114630 A1 10/2007

* cited by examiner

*Primary Examiner* — Adnan M Mirza

(57) ABSTRACT

The present invention relates to an image transmission method employed for communication between a Portable Device and a remote server by means of a network. It discloses a method for shortening the period during which the user of the Portable Device is left to wait for the loading of the webpage image on the device screen, which is part of the overall time required to navigate the web using a Portable Device.

13 Claims, 2 Drawing Sheets

IMAGE TRANSMISSION METHOD

FIELD OF THE INVENTION

The present invention relates to an image transmission method employed for communication between a Portable Device and a remote server by means of a network. It discloses a method for shortening the period during which the user of the Portable Device is left to wait for the loading of the webpage image on the device screen, which is part of the overall time required to navigate the web using a Portable Device.

BACKGROUND OF THE INVENTION

The user of the Portable Device accesses the Internet and World Wide Web, being said access performed using a communication network and always through a Proxy server. On a typical navigation session, the user calls up a browser software on the Portable Device with the intention of navigating to a certain webpage. Said application is in fact running in the Proxy server, which is connected to both the Portable Device and the Web Server.

The display screen of the Portable Device is smaller than that of a typical desktop computer, and the webpage lay-out is normally designed to fit said typical desktop computer screen. Therefore, in order to view the whole area of the webpage the user of the Portable Device has to use the scroll function.

The image of each webpage is sent from the Web server to the Proxy server through the network, typically broken down in frames. The frames are compressed separately by the Proxy server and sent over the network to the Portable Device. Upon selecting which frames of the webpage image are to be transmitted first, the Proxy server gives priority to those frames that make up the graphic area currently being displayed on the Portable Device screen, followed by those frames in the neighboring perimeter of said area. If the user starts to scroll towards a different area of the webpage image, the Proxy server starts to send the frames for the targeted area. If the user suddenly scrolls far away (down, for instance) even before the current screen of the Portable Device has finished loading on the Portable Device screen, the Proxy server starts transmission of frames giving priority to those frames that make up the graphic area newly addressed, followed by those frames in the neighboring perimeter of said area.

Every time the Portable Device receives a frame from the Proxy server, said frame is overlaid on the Portable Device screen at the specific display coordinates and replaces whatever content was there.

In the state of the art, there is an interval between the moment in which the user of the Portable Device clicks or types instructions to access a new webpage and the moment the image of said webpage is actually displayed on the Portable Device screen. Usually, during the first 2 to 10 seconds (and sometimes up to 40 seconds) the Proxy server is still receiving and/or processing the information received from the Web server, either because the Web server is slow or the network is congested between the Web server and the Proxy server. During this initial period it is said that the image of the accessed webpage is in flux state, in the sense that its content has not yet stabilized into the image it will eventually have. The Proxy server waits for the webpage content to settle down before it freezes the image, takes a snapshot of said image, divides said image into frames and starts transmitting said frames to the Portable Device for display to the user. The criterion used by the Proxy server to establish that the webpage has settled down is to wait from a signal from the browser software that all data has been received and the webpage is completely loaded. According to the state of the art, once said signal is received the Proxy server waits for a few seconds more and then the browser is frozen and kept from running, so in the Proxy server there is no further updating of the image. This last updated image is transmitted to the Portable Device.

The inconvenience of the state of the art is that the flux period of approximately 80% of the webpages lasts for about 6 to 7 seconds, during which the user of the Portable Device is waiting and the transmission has not even started yet. The level of anxiety of the user is considerable, especially considering that sometimes the user has to wait for the page to load only to find out that further navigation is required to reach the webpage the user ultimately desires to access.

Accordingly, there is a need in the current art for shortening the period during which the user of the Portable Device is left to wait for the loading of the webpage image on the device screen, which is part of the overall time required to navigate the web using a Portable Device as described above.

SUMMARY OF THE INVENTION

The navigation of the Internet using a Portable Device involves the transmission of images from the Proxy server to the Portable Device. During the process of said image transmission there is a flux period in which the Proxy server is downloading and processing the webpage which is thus not settled yet.

The present invention makes use of events signaled by the web browser software while the page is in flux state. These events are taken as landmarks in a time scale, being referred to as reference points. According to a certain aspect of the present invention, during the flux period the Proxy server takes a snapshot of its virtual display at reference point A, divides it into frames, compresses said frames and sends them to the Portable Device for display to the user.

According to other aspects of the present invention, further snapshots are selectively taken by the Proxy server and transmitted to the Portable Device at different reference points, causing updating of the image content displayed at the Portable Device.

Compared to the state of the art, the method of the present invention shortens the period during which the user of the Portable Device is left to wait for the loading of the webpage image on the device screen, which is part of the overall time required to navigate the web using a Portable Device.

The above as well as additional features and advantages of the present invention will become apparent in the following written detailed description.

BRIEF DESCRIPTION OF THE DRAWINGS

A more complete understanding of the present invention may be had by reference to the following detailed description when taken in conjunction with the accompanying drawings, wherein.

DETAILED DESCRIPTION

Figure 1:
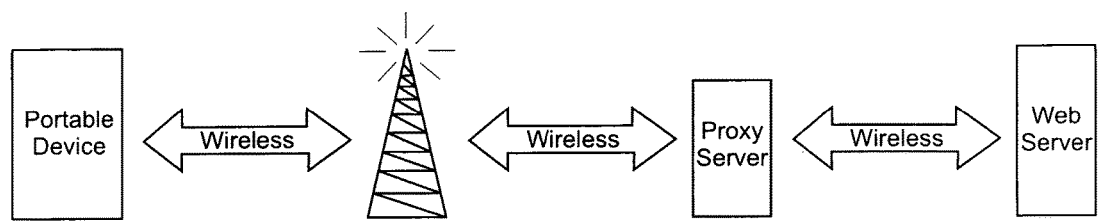
FIG. 1 is a schematic drawing illustrating the basic elements and the flow of data between them according to the present invention.

In order to eliminate ambiguities, some of the terms used in the following description will be now explained.

As used herein, the term "service provider's server" designates a computer that is separated from both the Portable Device and the Proxy server by a certain distance, and communicates with both by means of a network. All communication between the service provider's server and the Portable Device is performed through the Proxy server. In some cases the service provider's server provides access to the contents of a webpage, in which case it is typically referred to as the webpage server. As used herein, the term "webpage server" designates a server that provides access to webpage content—for instance Yahoo, CNN or similar ones—that is received by the invention's Proxy server, which rasterizes the data received from said webpage server, compresses it and transmits to the Portable Device.

As used herein, the term "Proxy server" designates a computer that is separated from both the Portable Device and the service provider's server—for instance a webpage server—by a certain distance and establishes the communication link between these by means of a network. The Proxy server typically runs applications—for instance a web browser application—according to user-input instructions. The Proxy server is capable of receiving and transmitting both vector and raster data, and is capable of rasterizing vector data into bitmap images. The Proxy server communicates to other computers by means of a network.

As used herein, the term "Portable Device" designates an electronic device of reasonably small dimensions which function is to allow data entry by the user and to display information received from a Proxy server. The Portable Device has a CPU (Central Processing Unit) that is capable of rasterizing the text data input by the user in the Portable Device for displaying in the Portable Device's screen. The Portable Device is capable of receiving both vector and raster data and is capable of transmitting vector data. The Portable Device communicates to other computers by means of a network, typically through a Proxy server. The Portable Device is capable of decompressing the compressed bitmap image data received from the Proxy server, displaying it and also scrolling through the image if necessary. The Portable Device incorporates an integrated keypad.

As used herein, the term "refreshment" designates the replacement of a first image frame by a second image frame which contents have changed since the moment when the first image frame was created. "Selective refreshment" designates the replacement of a given frame only if its image content has changed since the last time the same frame was created.

As used herein, the term "flux state" applies to the image displayed in a screen and designates the temporary state during which the image displayed to the user is incomplete and still evolving, as opposed to the final state in which the graphic content is already stabilized.

The basic elements according to the present invention are illustrated by FIG. 1. The user of the Portable Device navigates through the Internet and World Wide Web using a browsing software running at the Proxy server. A web server offers access to a web page. A wireless network connects said web server to the remote Proxy server. Said Proxy server is running a web browsing application, which gets data from the web server and saves a bitmap image of what would be the corresponding GUI display for that website initial page. The Proxy server then sends said bitmap image file across the wireless network, for instance passing through a cellular telephone link, to the Portable Device. The Portable Device receives the bitmap image and displays it on its screen for the user.

The present invention makes use of two events signaled by the web browser software while the page is in flux state, which are taken as landmarks in a time scale:

Navigation complete: The web browser software running in the Proxy server reports when it has successfully navigated to a webpage. The issuance of the "navigation complete" signal means the browser has found the webpage and is starting to download the information on it from the web server to the Proxy server.

Document complete: The web browser software running in the Proxy server reports when it has finished downloading the webpage contents.

On average "navigation complete" is reported about 0.5 second after the user requests the loading of the webpage, while "document complete" is reported about 5.5 to 7.5 seconds after that.

According to the present invention, reference point A is established 1.5 seconds after "navigation complete" is signaled by the browser application and reference point B is established 8.0 seconds after the "navigation complete" signal. According to statistical analysis, for 80% of the webpages, on point A the image of the webpage no longer changes with the passing of time, except for animation content. According to an embodiment of the present invention, on point A the Proxy server takes a snapshot of the virtual screen image of the webpage and sends for display in the Portable Device the frames that will correspond to the Portable Device screen area plus some frames around its perimeter. After that, upon reaching point B, the Proxy server sends to the Portable Device any frames which image content has changed since the earlier transmission performed on point A. The Proxy server establishes if a given frame content has changed since the transmission on point A by comparing the data content of the frames, and only re-sends a given frame at point B if its contents have indeed changed since the first transmission of this specific frame performed on point A. In an alternative embodiment of the present invention, the area covered by each individual frame—also known as frame modulation —is adapted so as to reduce the total amount of data to be compressed and sent over to the Portable Device where it is displayed for the user, with only those specific frames where the image content have changed since reference point A being transmitted again on reference point B and being overlaid on the Portable Device screen, replacing whatever content those frames had until then.

A third reference point C is established 10 seconds after the browser application signals "document complete". Up until said reference point C the program that is running in the Proxy server—for instance a web browsing application or an electronic mail application—keeps refreshing the image content displayed in the Proxy server virtual display, even though only discrete snapshots of said continually refreshed content are actually transmitted to the Portable Device as described above.

Figure 2:
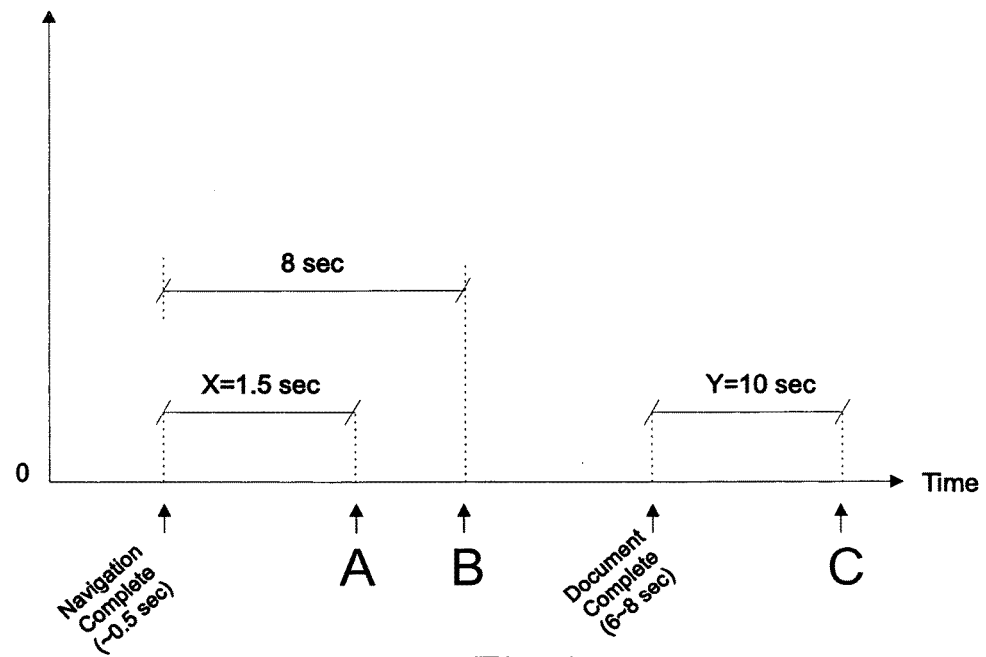
FIG. 2 is a graphic illustrating on a time scale the events taken as reference points according to the present invention.

FIG. 2 illustrates on a time scale the previously described reference points A, B and C.

Figure 3:
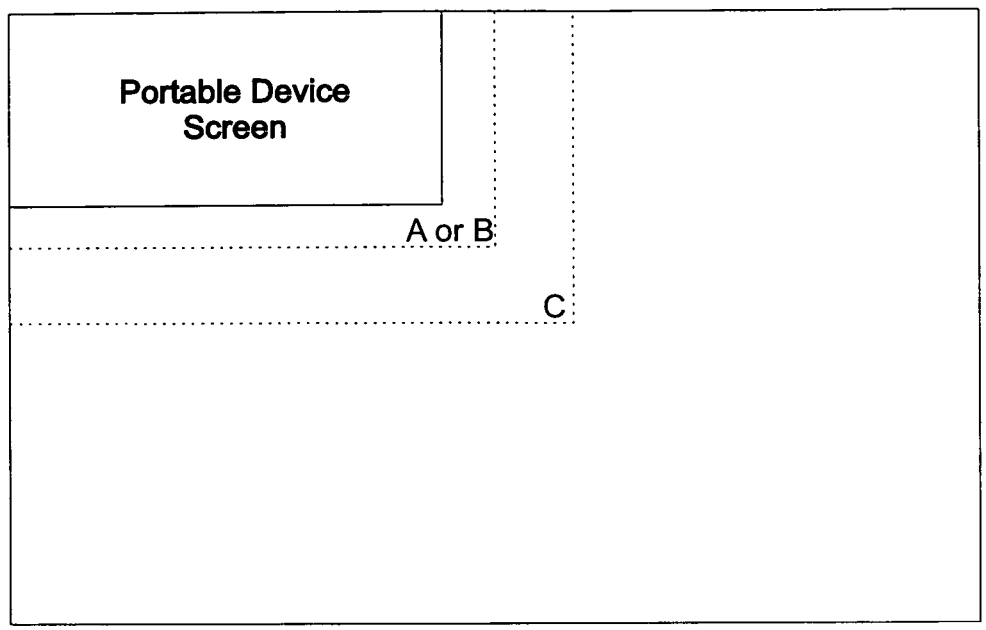
FIG. 3 illustrates the difference in size between the display area of the Proxy server and the display area of the Portable Device, with the dotted lines illustrating the area covered by the frames sent on reference points A or B as compared to the area covered by the frames sent on reference point C.

If the browser signals "document complete" before point B, then the re-sending of updated frames described in the previous paragraph is not performed on point B, being postponed until point C. Upon reaching point C, the Proxy server assumes there will be no further changes on the webpage image content, and thus the program that is running in the Proxy server stops refreshing the image content displayed in the Proxy server virtual display. In the industry jargon it is said that the program is frozen and kept from running, so in the Proxy server there is no further updating of the image. After said freezing, the Proxy server selectively transmits to the Portable Device only those frames which content has changes since the previous transmission of said specific frames, performed either on point A or B. On points A and B only the frames corresponding to a certain area around the perimeter of the Portable Device screen are sent or refreshed, whereas on point C a much bigger area—though not the whole webpage—is sent to the Portable Device. This situation is illustrated on FIG. 3.

Therefore, while still in a flux state, the webpage image content is transmitted from the Proxy server to the Portable Device once at point A, then there is a selective refreshment at point B and a final selective refreshment at point C. If the browser signals "document complete" before point B is reached or no frame content changes after point A, the transmission is performed only at points A and C.

Some webpages feature animation areas, in which the graphic content is continually changing. These are typically related to advertisement, although sometimes animation areas are used to display information on weather conditions, currency exchange rates, stock takers and similar types of information that typically change over time. According to the present invention, in case the webpage being transmitted from the Proxy server to the Portable Device features animation areas, the Portable Device displays discrete, successive and different frames at points A, B and C corresponding to said animation areas. For 80% of the webpages, no frames will be refreshed—and therefore transmitted—between points A and C except for possible animation areas featured by the webpage.

The present invention implements a compromise, striking a balance between speeding up the navigation process and reducing the volume of data transmitted over the web. The option of sending from the Proxy server to the Portable Device every iteration of frame content that changes during the flux period of a webpage would require the transmission of a lot of frames that are bound to change before point C is reached, entailing the transmission of a large volume of data across the web. Conversely, delaying the beginning of transmission to the Portable Device until point C is reached would leave the Portable Device user waiting idle for too long and ultimately slow down the navigation process.

Even in the specific case of webpages featuring animation areas the amount of data transmitted is smaller when compared to the state of the art, because only two or three frames of the animation areas are actually sent to the Portable Device, whereas in the state of the art a large number of animation frames would contribute to the volume of transmission during the flux state period.

According to statistical analysis, for 80% of the webpages the user could navigate to, the Proxy server sends frames to the Portable Device only once at point A and do not refresh it ever again. For the remainder 20% which take longer to load and/or contain animations, the frames are transmitted once at point A, and after that only those frames that actually change are refreshed. Furthermore, said refreshment happens no more than twice, at points B and C.

A first embodiment of the present invention is optimized for navigation speed at the expense of volume of data transmitted over the web. At reference point A the Proxy server takes a snapshot of the virtual screen image of the webpage and sends the corresponding compressed frames for display in the Portable Device. After that, upon reaching point B, the Proxy server sends to the Portable Device any frames which image content has changed since the earlier transmission performed on point A. After that, upon reaching point C, the Proxy server stops refreshing the image content displayed in the Proxy server virtual display—it freezes the browser—and sends to the Portable Device any frames which image content has changed since the earlier transmission performed on point B. Upon selecting frames for re-transmission to the Portable Device on points B and C the Proxy server detects frame content change on the animated areas. Therefore, the animated areas of the virtual display in the Proxy server are represented in the Portable Device screen by three discrete, successive frames corresponding to the snapshots taken at points A, B and C.

A second embodiment of the present invention modifies the balance proposed on the first embodiment. When compared to the first embodiment previously described, this second embodiment features a slightly slower navigation process in exchange for a reduced volume of data transmitted over the web: At reference point B the Proxy server takes a snapshot of the virtual screen image of the webpage and sends the corresponding compressed frames for display in the Portable Device. After that, upon reaching point C, the Proxy server stops refreshing the image content displayed in the Proxy server virtual display and sends to the Portable Device any frames which image content has changed since the earlier transmission performed on point B. Upon selecting frames for re-transmission to the Portable Device on point C the Proxy server detects frame content change on the animated areas. Therefore, the animated areas of the virtual display in the Proxy server are represented in the Portable Device screen by two discrete, successive frames corresponding to the snapshots taken at points B and C.

A third embodiment of the present invention further modifies the proposed balance by reducing the volume of data transmitted to the bare essential, in exchange for further slowing the navigation process when compared to the first and second embodiments previously described. According to this third embodiment, at reference point C the Proxy server stops refreshing the image content displayed in the Proxy server virtual display, takes a snapshot of the virtual screen image of the webpage and sends the corresponding compressed frames for display in the Portable Device. Therefore, the animated areas of the virtual display in the Proxy server are represented in the Portable Device screen by a single discrete frame corresponding to the single snapshot taken at point C.

An alternative embodiment of the present invention relies on website indication and previous configuration of the browser application to differentiate user-specified desired animation content—for example stock takers—from all other animation on a webpage. The desired animation content is tagged for continued refreshment at regular intervals, for instance at every 2 seconds, while the rest of the webpage content is treated according to each specific invention embodiment upon selecting frames for re-transmission to the Portable Device on points B and C.

Another alternative embodiment of the present invention replaces the use of reference points A, B and C by regular interval reference points, and ignores content change as a selection criterion. Instead of transmitting from the Proxy server to the Portable Device only updated frames at points B and C, this alternative embodiment transmits regularly timed snapshots of the Proxy's virtual display whether its content have changed or not. The frames corresponding to the area covered by the Portable Device display plus some frames in the neighboring perimeter of said area are compressed and sent from the Proxy server to the Portable Device as soon as any content is available for transmission, even before the browser software reports "Navigation Complete". In case a frame from the series corresponding to this very first snapshot of the webpage happen to be blank, this specific frame is not sent to the Portable Device, and the Proxy postpones the sending of said frame until the next snapshot is taken. At every modulation interval after the first snapshot—for example at every 1 second interval—the whole cycle of taking a snapshot of the virtual display, dividing it into frames, compressing them and sending to the Portable Device is repeated, for each and every frame regardless of image content change, unless it is a blank frame. The updating process is terminated after a previously set number of cycles are performed, for example 20. In an alternative embodiment of the present invention, the updating process is not interrupted, and so the Proxy server keeps sending frames of regular spaced snapshots for as long as the user remains connected to the Proxy server. In scenarios where the network speed is consistently high the choice of the alternative embodiment of regularly spaced snapshots can result in higher navigation speed.

In yet another alternative embodiment of the present invention, the Proxy server first maps the image to be transmitted to the Portable Device and divides said image into frames, then proceeds to taking snapshots of each of these frames and sending them in sequence to the Portable Device. This process is performed in a cyclic sweeping sequence—for example from left to right and top to bottom—and continues for as long as the user remains connected to the Proxy server.

While this invention has been particularly shown and described with reference to a preferred embodiment, it will be understood by those skilled in the art that various changes in form and detail may be made therein without departing from the spirit and scope of the invention. The invention in its broadest, and more specific aspects, is further described and defined in the claims which now follow.

I claim:

1. A method, comprising:
    a server receiving from a wireless device a first request for a web page;
    said server sending a second request for said web page to an address where said web page is located;
    said server rendering a virtual screen image of said web page with at least one of said web page's components missing;
    said server creating an image of said rendered virtual screen image of said web page missing said at least one of said web page's components, wherein, determination that said at least one of said web page's components are to be missing from said web page is not made by a user of said wireless device; and
    said server sending said image to said wireless device.

2. The method of claim 1, wherein said rendering of said image happens a period of time after reception of a navigation complete associated with said second request.

3. The method of claim 1, wherein said image includes representations of text of said web page.

4. The method of claim 1 wherein said image is sent to said wireless device with multiple packets containing different portions of said image.

5. The method of claim 4 wherein said different portions correspond to different surface area regions of said wireless device's display.

6. The method of claim 1 further comprising compressing said image after said creating of said image but before said sending of said image.

7. An apparatus, comprising:
    a server computer configured to:
    receive from a wireless device a first request for a web page;
    send a second request for said web page to an address where said web page is located;
    render a virtual screen image of said web page with at least one of said web page's components missing;
    create an image of said rendered virtual screen image of said web page missing at least one of said web page's components, wherein, determination that said at least one of said web page's components are to be missing from said web page is not made by a user of said wireless device; and
    send said image to said wireless device.

8. The apparatus of claim 7 wherein said rendering of said image happens a period of time after reception of a navigation complete associated with said second request.

9. The apparatus of claim 7 wherein said image includes representations of text of said web page.

10. The apparatus of claim 7 wherein said image is sent to said wireless device with multiple packets containing different portions of said image.

11. The apparatus of claim 10 wherein said different portions correspond to different surface area regions of said wireless device's display.

12. The apparatus of claim 7 wherein said server is further configured to compress said image after said creating of said image but before said sending of said image.

13. The apparatus of claim 7 wherein said server is any of:
    a proxy server;
    a web server;
    a service provider's server.

* * * * *